United States Patent
Asanuma et al.

[11] Patent Number: 5,888,636
[45] Date of Patent: Mar. 30, 1999

[54] MULTI-LAYER BLOW MOLDED ARTICLE OF POLYPROPYLENE

[75] Inventors: Tadashi Asanuma; Shigeru Kimura, both of Osaka-fu; Tamio Kawasumi, Kanagawa-ken; Shunji Ueda; Masami Hashimoto, both of Osaka-fu, all of Japan

[73] Assignee: Mitsui Chemicals, Inc., Tokyo, Japan

[21] Appl. No.: 585,749

[22] Filed: Jan. 16, 1996

[30] Foreign Application Priority Data

Jan. 19, 1995 [JP] Japan .................................. 7-006233
Feb. 20, 1995 [JP] Japan .................................. 7-030802

[51] Int. Cl.$^6$ ...................................................... B32B 27/32
[52] U.S. Cl. ....................... 428/213; 428/516; 428/36.91; 428/519
[58] Field of Search ..................... 428/515, 516, 428/35.7, 517, 519, 36.91, 213; 525/240

[56] References Cited

U.S. PATENT DOCUMENTS

| | | | |
|---|---|---|---|
| 5,254,394 | 10/1993 | Bothe et al. | 428/212 |
| 5,278,272 | 1/1994 | Lai et al. | 526/348.5 |
| 5,591,817 | 1/1997 | Asanuma et al. | 526/351 |
| 5,620,803 | 4/1997 | Oyama et al. | 428/516 |
| 5,637,367 | 6/1997 | Asnuma et al. | 428/36.92 |

FOREIGN PATENT DOCUMENTS 0 499 216 A1  8/1992  Germany .
2-41303   2/1990  Japan .
2-41305   2/1990  Japan .
2-215529  8/1990  Japan .
2-274703  11/1990 Japan .
2-274704  11/1990 Japan .
3-179005  8/1991  Japan .
3-179006  8/1991  Japan .
4-69394   3/1992  Japan .
7-32556   2/1995  Japan .

OTHER PUBLICATIONS

A. J. Pearson, "Metallo–organic Chemistry" John Wiley & Sons, p. 310, 1985.

*Primary Examiner*—Paul Thibodeau
*Assistant Examiner*—D. Lawrence Tarazano
*Attorney, Agent, or Firm*—Burns, Doane, Swecker & Mathis, L.L.P.

[57] ABSTRACT

A multi-layer blow molded article of a polypropylene comprising at least two layers, wherein at least one layer of the inner layer or layers comprises a resin composition containing 100-50 parts by weight of a syndiotactic polypropylene with an Mw/Mn of 3.0 or more and 0–50 parts by weight of an ethylene-α-olefin copolymer elastomer, and the outermost layer comprises a syndiotactic polypropylene with an Mw/Mn of less than 3.0, an isotactic polypropylene with an Mw/Mn of 6.0 or less, a resin composition containing 99-50 parts by weight of either of said polypropylenes and 1–50 parts by weight of an ethylene-α-olefin copolymer elastomer, or a polypropylene formed by heat degradation of a syndiotactic or isotactic polypropylene and having an Mw/Mn of 3.0 or more.

37 Claims, No Drawings

MULTI-LAYER BLOW MOLDED ARTICLE OF POLYPROPYLENE

BACKGROUND OF THE INVENTION a) Field of the Invention

The present invention relates to multi-layer blow molded articles of a polypropylene which are excellent in surface gloss, transparency, impact resistance and moldability.

b) Description of the Related Art

In general, polypropylenes are characteristically inexpensive and excellent in mechanical properties, hygienic adaptability and resistance to water vapor-permeation, and their molded articles have a good appearance. Therefore, they are widely used for various packaging materials and blow molded articles. Although commercially available isotactic polypropylenes show an excellent moldability upon forming blow molded articles, however, the surface of the molded articles is poor in gloss and hence lacks an impression of high grade; the molded articles have an insufficient transparency with a whiteness involved so that the appearance of their contents seems to differ in color from that of the actual matter; and when a liquid material with a high specific gravity such as an aqueous solution is fed as a product in a relatively large container with an internal volume of 100 ml or more, the container is occasionally broken due to the poor drop impact strength of the molded article particularly at low temperatures as in cold zones and refrigerators. The blow molded articles give rise to such problems and therefore their improvement has been desired.

In order to improve the surface gloss, it has been proposed to use a crystalline isotactic ethylene-propylene random copolymer having a specific ethylene content, melt flow index and molecular weight distribution in the outermost layer of a multi-layer plastic container (Japanese Patent Laid-Open No. 215529/1990). According to this method, however, the gloss is still insufficient to give an impression of high grade, though it is improved to some extent, and the transparency and the impact resistance are not improved. It has also been proposed to use a syndiotactic polypropylene or a resin composition comprising a syndiotactic polypropylene and an isotactic polypropylene in the outer layer (Japanese Patent Laid-Open No. 032556/1995). According to this method, the surface gloss is well improved and the transparency as a total laminate can also be excellent because the transparency of the outer layer is superior to that of the inner layer. However, substantially no improvement is seen in the drop impact strength of the molded article particularly at low temperatures.

In order to improve the drop impact resistance of a blow molded article particularly at low temperatures, it can be thought to impart impact resistance to the resin composition used in the outermost layer in a multi-layer blow molded article or to that used in the layer itself in a single-layer blow molded article. As a general method for imparting impact resistance, a variety of elastomers are incorporated. However, if an elastomer such as EPR is incorporated in an isotactic polypropylene, the impact resistance of the resultant blow molded article at low temperatures is significantly improved, but the surface gloss thereof is still inferior to that of the blow molded article made from a syndiotactic polypropylene, and the transparency is often degraded. Accordingly, desired blow molded articles which are excellent in surface gloss and superb in transparency have never been obtained. Thus, it has been very difficult to obtain a blow molded article of a polypropylene excellent in all of the surface gloss, transparency, drop impact resistance particularly at low temperatures, and moldability.

SUMMARY OF THE INVENTION

An object of the present invention is to provide a blow molded article of a polypropylene excellent in surface gloss, transparency and drop impact strength particularly at low temperatures.

Another object of the present invention is to provide a blow molded article of a polypropylene prepared with an excellent moldability.

The other objects of the present invention will be apparent from the description given below.

The above-described objects of the present invention have been achieved by the following molded article of a polypropylene.

A multi-layer blow molded article of a polypropylene comprising at least two layers, wherein at least one layer of the inner layer or layers comprises a resin composition containing 100-50 parts by weight of a syndiotactic polypropylene with an Mw/Mn of 3.0 or more and 0–50 parts by weight of an ethylene-α-olefin copolymer elastomer, and the outermost layer comprises a syndiotactic polypropylene with an Mw/Mn of less than 3.0, an isotactic polypropylene with an Mw/Mn of 6.0 or less, a resin composition containing 99-50 parts by weight of either a syndiotactic polypropylene with an Mw/Mn of less than 3.0 or an isotactic polypropylene with an Mw/Mn of 6.0 or less and 1–50 parts by weight of an ethylene-α-olefin copolymer elastomer, or a polypropylene formed by heat degradation of a syndiotactic polypropylene or isotactic polypropylene and having an Mw/Mn of 3.0 or more.

DESCRIPTION OF THE PREFERRED EMBODIMENTS

The syndiotactic polypropylene with an Mw/Mn of 3.0 or more used as one component of the resin composition for at least one layer of the inner layer or layers includes a syndiotactic homopolymer of propylene and random copolymer of propylene with a small amount, preferably 0.1–20% by weight, more preferably 0.1–10% by weight of an olefin other than propylene or a diene based on the copolymer. The above-mentioned Mw/Mn is preferably 3–20, particularly preferably 3.5–10. The olefin or diene copolymerized with propylene includes, for example, olefins such as ethylene, 1-butene, 1-hexene, 1-decene, 1-hexadecene, cyclopentene and norbornene and dienes such as hexadiene, octadiene, decadiene, dicyclopentadiene and 5-ethylidene-2-norbornene.

The reason for limiting the Mw/Mn in the above-described range is as follows. Factors controlling the moldability in blow molding include drawing-down characteristics exhibited when a molten resin under molding flows down from a die as a parison, in addition to molding cycle. The drawing-down characteristics is liable to be affected by the Mw/Mn, particularly in the case of a syndiotactic polypropylene, and is related to the fact that the smaller the Mw/Mn, the more rapidly the drawing-down proceeds, so that the weight of the resulting blow molded article is reduced, its dimensional stability is deteriorated, and the moldability is thus worsened. On the contrary, as the Mw/Mn of a syndiotactic polypropylene is increased, its drawing-down characteristics is improved so that a blow molded article with a desired shape and weight can easily be obtained. However, if the value of Mw/Mn is excessively large, the uniformity of the molten resin is reduced and therefore the transparency is degraded. Accordingly, by limiting the Mw/Mn of a syndiotactic polypropylene in the above-mentioned range, it becomes possible to obtain a molded article having substantially a desired shape and weight and also an excellent transparency.

The syndiotactic polypropylene with an Mw/Mn of 3.0 or more can be obtained by polymerizing propylene or propylene and the comonomer under the conditions known in the art in the presence of a catalyst comprising two or more crosslinked transition metal compounds having asymmetric ligands, in which the ligands or the metals (Zr, Hf, etc.) are different from each other, as disclosed, for example, in Japanese Patent Laid-Open Nos. 41303/1990, 41305/1990, 274703/1990, 274704/1990, 179005/1991, 179006/1991 and 69394/1992, and a co-catalyst such as methylalumimoxane. Such a syndiotactic polypropylene may also be obtained by mixing syndiotactic polypropylenes having different molecular weights synthesized in advance.

The molecular weight of the syndiotactic polypropylene thus obtained is preferably 0.05–50 g/10 min., more preferably 0.1–20 g/10 min. in terms of melt flow index (abbreviated to MFI hereunder) at 230° C., and furthermore preferably 0.5–10 g/10 min. where the moldability of the resin including that in the blow molding is taken into consideration. Further, its syndiotactic pentad fraction measured by $^{13}$C—NMR is 0.7 or more for the propylene homopolymer and 0.5 or more for the propylene copolymer.

The ethylene-α-olefin copolymer elastomer used as another component of the above-mentioned resin composition is an ethylene copolymer containing 15% by weight or more of an α-olefin having 3 or more carbon atoms. Examples of the α-olefin include 1-butene, 1-pentene, 1-hexene, 1-octene and 4-methylpentene-1.

The copolymer elastomer is obtained by copolymerizing the α-olefin with ethylene. The catalyst system used in the polymerization is preferably a homogeneous catalyst. Illustrative examples of such a catalyst include a vanadium compound-containing catalyst, a constrained geometry catalyst, and a metallocene-containing catalyst. A preferred example of the catalyst system is a homogeneous catalyst incorporating a transition metal complex having at least one aromatic ligand, particularly the complex of titanium, zirconium or hafnium. For example, a constrained geometry catalyst comprising one aromatic ligand as described in U.S. Pat. No. 5,278,272 can be used in the polymerization, and the polymerization can be effected by any process known in the art. Examples of ethylene elastomers produced using metallocene containing catalysts are available from Exxon under the name EXACT.

Where an ethylene-α-olefin copolymer elastomer obtained through polymerization by using a metallocene-containing catalyst or constrained geometry catalyst is blended, the transparency of the resultant blow molded article is scarcely impaired. Further, the bleeding is caused to a smaller extent in the blending with a syndiotactic polypropylene because the amount of low-molecular weight components is small, and therefore the good appearance of the molded article can be maintained. Thus, the use of a metallocene-containing catalyst is particularly favored.

The ethylene-α-olefin copolymer elastomer thus obtained has an MFI of 0.1–100 g/10 min., preferably of 0.5–60 g/10 min. at 230° C.

The above-mentioned resin composition used in the inner layer of the blow molded article of the present invention contains 100-50 parts by weight of a syndiotactic polypropylene with an Mw/Mn of 3.0 or more and 0–50 parts by weight of an ethylene-α-olefin copolymer elastomer.

The resin composition may incorporate, if necessary, various additives such as a heat stabilizer, weathering stabilizer, ultraviolet light absorber, radiation-resistant agent, crystal nucleating agent, inorganic filler, lubricant, plasticizer, organic peroxide, neutralizer, crosslinking agent, pigment and dye and an auxiliary material like an elastomer for improving the mechanical properties, which are generally used in polypropylene resins, unless they significantly injure the effect of the present invention as a blow molded article.

Illustrative examples of the above-mentioned elastomer may embrace an ethylene-propylene copolymer rubber, ethylene-propylene-diene copolymer rubber, propylene-butene copolymer rubber and styrene-diene block copolymer rubber and rubbers formed by hydrogenating these copolymer rubbers.

The resin composition can be prepared by mixing the syndiotactic polypropylene, the ethylene-α-olefin copolymer elastomer and, if necessary, the above-mentioned various additives by a mixer such as a Henschel mixer, melting and kneading the mixture by means of an extruder, Banbury mixer, pressure kneader or roller, and granulating the kneaded mixture.

The outermost layer of the blow molded article of the present invention employs a syndiotactic polypropylene with an Mw/Mn of less than 3.0, an isotactic polypropylene with an Mw/Mn of 6.0 or less, or a polypropylene formed by heat degradation of a crystalline polypropylene and having an Mw/Mn of 3.0 or more.

A polypropylene resin composition containing 99-50 parts by weight of either a syndiotactic polypropylene with an Mw/Mn of less than 3.0 or an isotactic polypropylene with an Mw/Mn of 6.0 or less and 1–50 parts by weight of an ethylene-α-olefin random copolymer elastomer can be employed as the outermost layer.

Further, the heat-degraded polypropylene includes a polypropylene formed by heat degradation of a syndiotactic polypropylene or isotactic polypropylene and having an Mw/Mn of 3.0 or more. The heat-degraded isotactic polypropylene having an Mw/Mn of 3.0 or more is preferred.

The syndiotactic polypropylene with an Mw/Mn of less than 3.0 is a syndiotactic homopolymer or syndiotactic copolymer of propylene obtained by polymerizing propylene or propylene and a small amount of a comonomer except propylene, for example, an olefin such as ethylene, 1-butene, 1-hexene, 1-decene, 1-hexadecene, cyclopentene and norbornene or a diene such as hexadiene, octadiene, decadiene, cyclopentadiene and 5-ethylidene-2-norbornene under the conditions known in the art in the presence of a catalyst comprising only one crosslinkable transition metal compound having asymmetric ligands as disclosed in Japanese Patent Laid-Open Nos. 41303/1990, 41305/1990, 274703/1990, 274704/1990, 179005/1991, 179006/1991 and 69394/1992 by way of example and a co-catalyst. The content of the comonomer in the copolymer is preferably 0.1–20% by weight, more preferably 0.1–10% by weight.

The molecular weight of the syndiotactic polypropylene so obtained is preferably 0.05–50 g/10 min., more preferably 0.1–20 g/10 min., furthermore preferably 0.5–10 g/10 min. in terms of MFI at 230° C. The syndiotactic pentad fraction measured by $^{13}$C—NMR is preferably 0.7 or more for the propylene homopolymer and preferably 0.5 or more for the propylene copolymer.

The isotactic polypropylene with an Mw/Mn of 6.0 or less is also available on the market. It is however prepared through polymerization by a process known in the art by using a known catalyst system which can be used generally in the production of isotactic polypropylenes, for example, a titanium compound and an organoaluminum compound, followed by heat-degradation of the resulting polymer by using an organic peroxide, etc. to control its Mw/Mn in the preferred range. The isotactic polypropylene thus prepared or that prepared through polymerization by using a homogeneous metallocene catalyst may preferably be used.

The isotactic polypropylene may also be a copolymer of propylene with a small amount of an olefin or diene as is the case with the above-mentioned syndiotactic polypropylene.

Here, the molecular weight of the isotactic polypropylene is preferably 0.05–50 g/10 min., more preferably 0.1–20 g/10 min. in terms of MFI at 230° C., and furthermore preferably 0.5–10 g/10 min. where the moldability of the resin including that in the blow molding is taken into consideration. Further, the Mw/Mn is preferably 6.0 or less, more preferably 5.5 or less, furthermore preferably 5.0 or less.

The effect of improving the surface gloss is exhibited by using a syndiotactic polypropylene with an Mw/Mn of less than 3.0 or an isotactic polypropylene with an Mw/Mn of 6.0 or less.

To exhibit the effect of the present invention efficiently, the isotactic polypropylene includes preferably a crystalline isotactic propylene-ethylene random copolymer, or more preferably a crystalline isotactic propylene-ethylene random copolymer having an ethylene content of 2–8% by weight, an MFI of 2.5 g/10 min. or more and an Mw/Mn of 3–5 as proposed in Japanese Patent Laid-Open No. 215529/1990, because it gives a very excellent surface gloss.

The resin composition comprising either a syndiotactic polypropylene with an Mw/Mn of less than 3.0 or an isotactic polypropylene with an Mw/Mn of 6.0 or less and an ethylene-α-olefin copolymer elastomer contains 99-50 parts by weight of either of the above-mentioned polypropylenes and 1–50 parts by weight of the above-mentioned elastomer. The same elastomer as used in the resin composition for the inner layer may be used as the elastomer used in this resin composition. The resin composition may incorporate a variety of the same additives as used in the resin composition for the inner layer. The resin composition is prepared by the same procedure as employed in the preparation of the resin composition for the inner layer.

Where the resin composition is used, the transparency of the blow molded article is scarcely impaired. Further, the bleeding is caused to a smaller extent in the blending because the amount of low-molecular weight components is small, and therefore the good appearance of the molded article can be maintained.

The proportion of the ethylene-α-olefin copolymer elastomer in the blend is within the above-mentioned range and can be varied depending on purposes. However, in order to achieve the effect of the present invention sufficiently, the proportion of the copolymer elastomer is preferably 5–45 parts by weight, more preferably 10–40 parts by weight. If the proportion of the copolymer elastomer is less than 1 part by weight, the drop impact strength of the molded article particularly at low temperatures is low, although the transparency and surface gloss are excellent. When the proportion exceeds 50 parts by weight, the transparency is deteriorated and the surface gloss is also degraded, though the drop impact strength of the molded article is high. Therefore, any proportions outside the above-mentioned range are not preferred.

The heat-degraded crystalline polypropylene with an Mw/Mn of 3.0 or more is obtained by heat-degradation of a syndiotactic polypropylene or isotactic polypropylene. The heat-degradation is effected, for example, by adding an organic peroxide to a powder of the above-mentioned polypropylene, mixing them in a Henschel mixer, etc. and kneading the same by an extruder, etc., or kneading again pellets of the above-mentioned polypropylene by an extruder, etc., while introducing an organic peroxide into the extruder.

In the present invention, the resin composition comprising 100-50 parts by weight of a syndiotactic polypropylene and 0–50 parts by weight of an ethylene-α-olefin copolymer elastomer is used in at least one inner layer of a multi-layer blow molded article having at least two layers. The preferred proportion of the elastomer used in the resin composition can be varied depending on purposes. However, in order to achieve fully the effect of the present invention that the impact resistance is sufficient even in a low-temperature environment as in a cold zone or refrigerator and moreover the transparency is sufficiently high, the proportion of the elastomer is preferably 1–30 parts by weight, more preferably 2–20 parts by weight. If the proportion of the elastomer exceeds 50 parts by weight, the transparency is unfavorably deteriorated, although the impact resistance of the molded article is high. Further, to achieve a sufficient impact resistance, it is necessary that the thickness of the layer of the aforementioned resin composition is at least 100 $\mu$m.

In the multi-layer blow molded article of the present invention, the outermost layer is a layer comprising a syndiotactic polypropylene with an Mw/Mn of less than 3.0, an isotactic polypropylene with an Mw/Mn of 6.0 or less, a polypropylene with an Mw/Mn of 3.0 or more prepared by heat-degradation of a syndiotactic polypropylene or isotactic polypropylene, or a resin composition comprising either a syndiotactic polypropylene with an Mw/Mn of less than 3.0 or an isotactic polypropylene with an Mw/Mn of 6.0 or less and an ethylene-α-olefin copolymer elastomer. The reason for this is to maintain the releasability of the molded article as well as the surface gloss, transparency and low-temperature drop impact strength of the molded article in a good condition.

According to the present invention, the moldability in the blow molding is markedly improved, because the Mw/Mn of the syndiotactic polypropylene, that is a constituent of the composition used in the inner layer in the present invention, is 3 or more. However, in a blow molded article molded from a composition containing a syndiotactic propylene with an Mw/Mn of 3 or more, the surface condition is inferior and both the gloss and the transparency are very poor. Hence, when a multi-layer blow molded article is prepared by using a syndiotactic polypropylene or isotactic random copolymer with a small Mw/Mn as described above in the surface layer, the transparency as a whole is remarkably improved, and moreover the gloss of the surface layer is bettered. Thus, a very favorable molded article is obtained.

In order that the blow molded article of the present invention achieves a satisfactory transparency, it is desired that the transparency of the polypropylene in the outermost layer be as high as possible, and the thickness of the outermost layer and a layer or layers other than the layer or layers of a syndiotcatic polypropylene with an Mw/Mn of 3.0 or more or a resin composition comprising the syntiotactic polypropylene and an ethylene-α-olefin copolymer elastomer which exhibit the transparency in the inner layer or layers be as thin as possible. In other words, the sum of the thickness of the layer or layers other than the layer or layers of a syndiotactic polypropylene with an Mw/Mn of 3.0 or more or a resin composition comprising the syndiotactic polypropylene and an ethylene-α-olefin copolymer elastomer is preferably 50% or less, more preferably 40% or less, furthermore preferably 30% or less of the total thickness and is preferably 400 μm or less. Any blow molded articles with the thickness beyond the range are not preferred, because they fail to attain the transparency of the present invention.

To prepare a multi-layer blow molded article of the present invention, and where a two-layer article is prepared by way of example, resin compositions to be used respectively in the outer layer and the inner layer are separately melted and kneaded by means of extruders, etc. and the molten resins are individually fed into a die head having double-ring dies to extrude them simultaneously. Upon being discharged from the dies, they are combined laminatedly into a double parison.

Dies for molding multi-layer parisons may be used as described above to produce the multi-layer molded article of the present invention.

The blow molded article of the present invention is a bottle, tank, etc. in accordance with uses.

Where a blow molded article is composed of two layers in the present invention, the layer outside is the outermost layer and the layer inside is the inner layer. Where the blow molded article is composed of three layers, the layer most inside and the layer most outside are the outermost layers and the layer between the two outermost layers is the inner layer. The inside layer of the outermost layers has preferably the same composition of a polypropylene or a polypropylene resin composition as that of the outside outermost layer, but it may also be made up of the same polypropylene resin composition as used in the inner layer. Alternatively, the most outside layer and the most inside layer of the three layers are used as the outermost layer and the inner layer, respectively, and as the layer between them, a layer is provided which is made up of an ethylene-vinyl alcohol copolymer or nylon that is excellent in the barrier properties to oxygen, etc. In this case, an adherent resin such as a polypropylene modified with maleic anhydride may exist between the layers. Blow molded articles having the oxygen-barrier layer are used as packaging materials or containers for foodstuffs and medical supplies.

The multi-layer blow molded article of a polypropylene according to the present invention is excellent in surface gloss and very superb in transparency as compared with the conventional polypropylene blow molded articles, because it incorporates a specific polypropylene or a specific polypropylene resin composition in the outermost layer and the inner layer. Therefore, its contents can be seen clearly without injuring the color and the appearance. Further, since it can prevent the breakage due to falling of the product particularly at low temperatures, it is suitably used as a container. Moreover, it is readily moldable because the moldability of the resin is equivalent to that of isotactic polypropylenes employed in the conventional blow molding.

In the present invention, Mw/Mn is measured at 350° C. by coupling, for example, a high temperature GPC150C column manufactured by Waters Co. with two sets of a GPC column AD-806MS manufactured by Showa Denko K. K. and using 1,2,4-trichlorobenzene as a mobile phase.

For the purpose of illustration in further detail, the present invention will now be described by the following examples. Of course, the present invention shall not be limited to the following examples.

The methods of testing in the examples are as follows:
(1) Melt flow index: based on ASTM D-1238.
(2) Haze: based on ASTM D-1003.
(3) Surface gloss: based on ASTM D-1003.
(4) Low-temperature drop impact strength: A blow molded article filled with ice water was allowed to stand for a day in a temperature controlled bath at 2° C., sealed with a gummed tape at the mouth, and allowed to fall down onto a concrete floor with the bottom of the bottle facing downward. The maximum height (m) at which no breakage took place was taken to be a low-temperature drop impact strength.
(5) Moldability: A parison was extruded at 170° C. and blow molded at a mold temperature of 25° C. in a blow time of 35 sec. When the blow molded article was removed manually from the mold, the easiness of release was observed and the moldability of the article was ranked as follows: ○: releasable without any trouble, like that of the conventional isotactic polypropylene, ×: hardly releasable and deformed to need a further blow time.

EXAMPLE 1

A syndiotactic homopolymer of propylene (having an MFI at 230° C. of 1.4 g/10 min., a crystal melting point of 131° C. as measured by differential scanning calorimetry, a syndiotactic pentad fraction of 0.845 and an Mw/Mn of 4.1; abbreviated to SPP hereunder) was prepared by the bulk polymerization of propylene in the presence of hydrogen by using a catalyst comprising diphenylmethylene (cyclopentadienyl)fluorenylzirconium dichloride, isopropylidenecyclopentadienyl-2,7-di-tert-butylfluorenylzirconium dichloride and methylaluminoxane. To 90 parts by weight of the SPP thus obtained and 10 parts by weight of an ethylene-butene random copolymer elastomer polymerized by a metallocene-containing catalyst (EXACT 4041, having an MFI at 230° C. of 5.5 g/10 min., manufactured by Exxon Corp.) were added 0.10 part by weight of Irgaphos 168 (manufactured by Ciba Geigy AG) and 0.05 part by weight of Irganox 1010 (manufactured by Ciba Geigy AG) as antioxidants and 0.02 part by weight of calcium stearate as a neutralizer, and the mixture was blended in a Henschel mixer and pelletized by an extruder at a cylinder temperature of 210° C. to prepare an inner layer resin.

Then, while pellets of an crystalline isotactic propylene-ethylene random copolymer (MJS-G, manufactured by Mitsui Toatsu Chemicals, Inc., having an MFI at 230° C. of 1.5 g/10 min., an ethylene content of 5.1% by weight and an Mw/Mn of 6.3) were extruded by an extruder at 210° C., 0.023 part by weight of 2,5-dimethyl-2,5-di-(tert-butylperoxy)hexane (Rupazol 101, manufactured by Yoshitomi Pharmaceutical Ind.) was fed through the inlet of the extruder to each 100 parts by weight of the MJS-G to heat-degrade the same. Thus, pellets having an MFI at 230° C. of 6.4 g/10 min. and an Mw/Mn of 4.3 were granulated as an outer layer resin.

Subsequently, the inner layer resin and the outer layer resin were fed to a 30-mm diameter extruder for the inner layer and a 40-mm diameter extruder for the outer layer, respectively, to extrude a two-layer molten parison at 170° C. The parison was blow molded at a mold temperature of 25° C. in a blow time of 35 sec to obtain a two-layer blow molded bottle with a screwed neck having a total height of 180 mm, a diameter of 65 mm, an internal volume of 470 ml and an average thickness of the body of 900 μm. The thickness of each layer of the bottle was so adjusted that the outer layer and the inner layer might have a thickness of 120 μm and 780 μm respectively, by controlling the number of revolution of the screw in each of the extruders for the inner and the outer layers. The surface gloss and the transparency of the body in terms of a haze value were as good as 80% and 15%, respectively. The low-temperature drop impact strength was as high as 2.1 m and the releasability was also ○.

EXAMPLE 2

A blow molded bottle was obtained by the same procedure as employed in Example 1, except that an ethylene-octene random copolymer elastomer polymerized by a constrained geometry catalyst (ENGAGE 8200, manufactured by The Dow Chemical Co., having an MFI at 230° C. of 9.8 g/10 min.) was employed as the elastomer used in the inner layer resin. The surface gloss of the bottle and the transparency of the body in terms of a haze value were as good as 80% and 14%, respectively. The low-temperature drop impact strength was as high as 2.5 m, and the releasability was also ○.

EXAMPLE 3

A blow molded bottle was obtained by the same procedure as employed in Example 1, except that an ethylene-butene random copolymer elastomer polymerized by a homogeneous catalyst (Toughmer A 4085, having an MFI at 230° C. of 6.7 kg/10 min., manufactured by Mitsui Petrochemical Industries, Ltd.) was employed as the elastomer used in the inner layer resin. The surface gloss of the bottle and the transparency of the body in terms of a haze value were as good as 80% and 16%, respectively. The low-temperature drop impact strength was as high as 2.2 m, and the releasability was also ○.

EXAMPLE 4

A blow molded bottle was obtained by the same procedure as employed in Example 1, except that the proportion in the resin composition used as the inner layer resin was changed to 95 parts by weight of the SPP and 5 parts by weight of the elastomer blended. The surface gloss of the bottle and the transparency of the body in terms of a haze value were as good as 80% and 11%, respectively. The low-temperature drop impact strength was high as 1.7 m, and the releasability was also ○.

EXAMPLE 5

A blow molded bottle was obtained by the same procedure as employed in Example 1, except that the resin composition used as the inner layer resin was changed to 100 parts by weight of the SPP with no elastomer blended. The surface gloss of the bottle was 80%, and the transparency of the body was extremely good as 7% in terms of a haze value. The releasability was also ○, but the low-temperature drop impact strength was 1.0 m, showing that the impact strength was somewhat insufficient.

EXAMPLE 6

A blow molded bottle was obtained by the same procedure as employed in Example 1, except that while 95 parts by weight of MJS-G and 5 parts by weight of Toughmer A 4085 were blended as pellets and extruded at 230° C. by an extruder in place of the MJS-G, 2.3 parts by weight of Rupazol 101 were added in the same manner as in Example 1 to each 100 parts by weight of the pellets to heat-degrade the same, thereby obtaining an outer layer resin having an MFI of 6.0 and an Mw/Mn of 4.9. The gloss of the bottle and the transparency of the body in terms of a haze value were as good as 78% and 15%, respectively. The low-temperature drop impact strength was as high as 1.5 m, and the releasability was also ○.

EXAMPLE 7

A three-layer blow molded bottle, in which the inner layer was held substantially between two layers of MJS-G, was obtained by the same procedure as employed in Example 1, except that another 30-mm diameter extruder was provided so as to laminate a new third layer inside the inner layer, and MJS-G was fed to the extruder to extrude a three-layer parison, which was blow molded so that the outer layer, the inner layer and the third layer might have a thickness of 120 μm, 660 μm and 120 μm, respectively. The low-temperature drop impact strength of the bottle was as high as 1.8 m, and the releasability was also ○. However, the transparency of the body was 22% in terms of a haze value and hence was somewhat poor. Nevertheless, the drawdown of the parison was very stable and the blow molding was carried out quite easily. Thus, it was possible to set molding conditions in a wide range.

EXAMPLE 8

To 70 parts by weight of the SPP obtained in Example 1 and 30 parts by weight of an ethylene-butene random copolymer elastomer polymerized by a homogeneous catalyst (Toughmer A 4085, having an MFI at 230° C. of 6.7 g/10 min., manufactured by Mitsui Petrochemical Ind.) were added 0.10 part by weight of Irgaphos 168 (manufactured by Ciba Geigy AG) and 0.05 part by weight of Irganox 1010 (manufactured by Ciba Geigy AG) as antioxidants and 0.02 part by weight of calcium stearate as a neutralizer. The mixture was blended in a Henschel mixer and pelletized by an extruder at a cylinder temperature of 210° C. to prepare an inner layer resin.

On the other hand, an SPP (having an MFI at 230° C. of 3.2 g/10 min., a peak crystallization temperature of 74.6° C. as measured by differential scanning calorimetry, a crystal melting point of 130° C., a syndiotactic pentad fraction of 0.767 and an Mw/Mn of 2.6) had been prepared by the bulk polymerization of propylene in the presence of hydrogen by using a catalyst comprising diphenylmethylene (cyclopentadienyl)fluorenylzirconium dichloride and methylaluminoxane. To 70 parts by weight of the SPP thus obtained and 30 parts by weight of an ethylene-butene random copolymer elastomer polymerized by a homogeneous catalyst (Toughmer A 4085, having an MFI at 230° C. of 6.7 g/10 min., manufactured by Mitsui Petrochemical Industries, Ltd.) were added 0.10 part by weight of Irgaphos 168 (manufactured by Ciba Geigy AG) and 0.05 part by weight of Irganox 1010 (manufactured by Ciba Geigy AG) as antioxidants and 0.02 part by weight of calcium stearate as a neutralizer. The mixture was blended in a Henschel mixer and pelletized by an extruder at a cylinder temperature of 210° C. to prepare an outer layer resin.

Then, the outer layer resin and the inner layer resin were fed to a 40-mm diameter extruder and a 30-mm diameter extruder, respectively, to extrude a two-layer molten parison at 200° C. The parison was molded in a blow time of 20 sec to obtain a two-layer molded bottle with a screwed neck having a total height of 180 mm, a diameter of 65 mm, an internal volume of 470 ml and an average thickness of the body of 1,000 μm. The transparency of the body of the bottle was 39% in terms of a haze value, and the surface gloss was as good as 90%. The low-temperature drop impact strength showed a very high value of 3.0 m or more.

COMPARATIVE EXAMPLE 1

A blow molded bottle was obtained by the same procedure as employed in Example 1, except that a heat degraded MJS-G was fed through two extruders for the outer and the inner layers to obtain a substantially single-layered blow molded bottle. The surface gloss of the bottle and the releasability were as good as 80% and ○, respectively. However, the transparency of the body of the bottle showed a very poor value of 51% in terms of a haze value. The low-temperature drop impact strength was also poor as 0.5 m.

COMPARATIVE EXAMPLE 2

A blow molded bottle was obtained by the same procedure as employed in Example 1, except that without using the isotactic polypropylene in the outer layer resin, the resin composition used in the inner layer was also used in the outer layer to prepare a substantially single-layered blow molded bottle. The surface gloss of the bottle and the transparency of the body in terms of a haze value were as good as 83% and 11%, respectively. The low-temperature drop impact strength was as high as 2.3 m, but the releasability was × and inferior to that of the isotactic polypropylene.

COMPARATIVE EXAMPLE 3

A blow molded bottle was obtained by the same procedure as employed in Example 1, except that the MJS-G was not heat-degraded but was used as it is as the outer layer resin. The transparency of the body of the bottle in terms of a haze value, the low-temperature drop impact strength and the releasability were as good as 16%, 2.2 m and ○, respectively. However, the surface gloss was low as 62%.

What is claimed is:

1. A multi-layer blow molded article of a polypropylene comprising at least an inner layer and an outside layer, wherein (a) the inner layer comprises a resin composition comprising (i) 100-50 parts by weight of a syndiotactic polypropylene homopolymer or random copolymer with an Mw/Mn of 3.0 or more and (ii) 0–50 parts by weight of an ethylene-α-olefin copolymer elastomer, and (b) the outside layer comprises a member selected from the group consisting of (i) a syndiotactic polypropylene with an Mw/Mn of less than 3.0, (ii) an isotactic polypropylene with an Mw/Mn of 6.0 or less, (iii) a resin composition which comprises 99-50 parts by weight of either a syndiotactic polypropylene with an Mw/Mn of less than 3.0 or an isotactic polypropylene with an Mw/Mn of 6.0 or less and 1–50 parts by weight of an ethylene-α-olefin copolymer elastomer, and (iv) a polypropylene formed by heat degradation of a syndiotactic polypropylene or isotactic polypropylene.

2. The molded article according to claim 1 wherein the outside layer comprises a syndiotactic polypropylene with an Mw/Mn of less than 3.0.

3. The molded article according to claim 1 wherein the outside layer comprises a resin composition comprising 99-50 parts by weight of a syndiotactic polypropylene with an Mw/Mn of less than 3.0 and 1–50 parts by weight of an ethylene-α-olefin copolymer elastomer.

4. The molded article according to claim 1 wherein the outside layer comprises an isotactic polypropylene with an Mw/Mn of 6.0 or less.

5. The molded article according to claim 1 wherein the outside layer comprises an isotactic polypropylene with an Mw/Mn of 6.0 or less wherein said propylene obtained by heat degradation.

6. The molded article according to claim 1 wherein the syndiotactic polypropylene with an Mw/Mn of 3.0 or more is a propylene-olefin or propylene-diene copolymer comprising 0.1–20% by weight of units of an olefin other than propylene or a diene based on the weight of the copolymer.

7. The molded article according to claim 2 wherein said syndiotactic polypropylene is a propylene-olefin or propylene-diene copolymer weight of the comprising 0.1–20% by weight of units of an olefin other than propylene or a diene based on the copolymer.

8. The molded article according to claim 3 wherein said syndiotactic polypropylene is a propylene-olefin or propylene-diene weight of the copolymer comprising 0.1–20% by weight of units of an olefin other than propylene or an diene based on the copolymer.

9. The molded article according to claim 4 wherein said isotactic polypropylene is a propylene-olefin or propylene-diene weight of the copolymer comprising 0.1–20% by weight of units of an olefin other than propylene or a diene based on the copolymer.

10. The molded article according to claim 5 wherein said isotactic polypropylene is a propylene-olefin or propylene-diene weight of the copolymer comprising 0.1–20% by weight of units of an olefin other than propylene or a diene based on the copolymer.

11. The molded article according to claim 1 wherein the inner layer comprises a resin composition containing 100-50 parts by weight of a syndiotactic polypropylene with an Mw/Mn of 3.5–10 or a propylene-α-olefin copolymer containing 0.1–20% by weight of an α-olefin other than propylene based on the weight of the copolymer and 0–50 parts by weight of an ethylene-α-olefin copolymer elastomer.

12. The molded article according to claim 1, which consists of two layers.

13. The molded article according to claim 12 wherein the outer layer comprises a crystalline isotactic propylene-ethylene random copolymer having an ethylene content of 2–8% by weight, melt flow index of 2.5 g/10 min. or more and an Mw/Mn of 3–5.

14. The molded article according to claim 1, wherein the inner layer comprises a resin composition which comprises 100-50 parts by weight of a syndiotactic polypropylene with an Mw/Mn of between 3 and 20.

15. The molded article according to claim 14, wherein the inner layer comprises a resin composition which comprises 100-50 parts by weight of a syndiotactic polypropylene with an Mw/Mn of between 3.5 and 10.

16. The molded article according to claim 1, wherein the outside layer has a thickness of 50% or less of the total thickness of the molded article.

17. The molded article according to claim 16, wherein the outside layer has a thickness of 40% or less of the total thickness of the molded article.

18. The molded article according to claim 17, wherein the outside layer has a thickness of 30% or less of the total thickness of the molded article.

19. The molded article according to claim 1, wherein the outside layer has a thickness of 400 μm or less.

20. The molded article according to claim 1, wherein the outside layer comprises an isotactic polypropylene with an Mw/Mn of 3 to 5, which polypropylene is obtained by heat degradation.

21. A multi-layer blow molded article of a polypropylene comprising at least an inside layer, an inner layer and an outside layer, wherein (a) the inside layer and the outside layer of the molded article each comprise one member selected from the group consisting of:
(i) a syndiotactic propylene with an Mw/Mn of less than 3.0,
(ii) an isotactic polypropylene with an Mw/Mn of 6.0 or less,
(iii) a resin composition which comprises 99-50 parts by weight of either a syndiotactic polypropylene with an Mw/Mn of less than 3.0 or an isotactic polypropylene with an Mw/Mn of 6.0 or less and 1–50 parts by weight of an ethylene-α-olefin copolymer elastomer, and
(iv) a polypropylene formed by heat degradation of a syndiotactic polypropylene or isotactic polypropylene;

and (b) the inner layer between the inside layer and the outside layer comprises a resin composition which comprises 100-50 parts by weight of a syndiotactic polypropylene homopolymer or random copolymer with an Mw/Mn of 3.0 or more and 0–50 parts by weight of an ethylene-α-olefin copolymer elastomer.

22. The molded article according to claim 16 wherein each of the inside layer and the outside layer comprises a crystalline isotactic propylene-ethylene random copolymer having an ethylene content of 2–8% by weight, a melt flow index at 230° C. of 2.5 g/10 min. or more and an Mw/Mn of 3–5.

23. The molded article according to claim 21, which consists of three layers.

24. The molded article according to claim 21, wherein the inside layer and the outside layer together have a thickness of 50% or less of the total thickness of the molded article.

25. The molded article according to claim 24, wherein the inside layer and the outside layer together have a thickness of 40% or less of the total thickness of the molded article.

26. The molded article according to claim 25, wherein the inside layer and the outside layer together have a thickness of 30% or less of the total thickness of the molded article.

27. The molded article according to claim 21, wherein the inside layer and the outside layer together have a thickness of 400 μm or less.

28. A multi-layer blow molded article of a polypropylene comprising at least an inside layer, an inner layer and an outside layer,
wherein (a) the outside layer of the molded article comprises one member selected from the group consisting of:
(i) a syndiotactic propylene with an Mw/Mn of less than 3.0,
(ii) an isotactic polypropylene with an Mw/Mn of 6.0 or less,
(iii) a resin composition which comprises 99-50 parts by weight of either a syndiotactic polypropylene with an Mw/Mn of less than 3.0 or an isotactic polypropylene with an Mw/Mn of 6.0 or less and 1–50 parts by weight of an ethylene-α-olefin copolymer elastomer, and
(iv) a polypropylene formed by heat degradation of a syndiotactic polypropylene or isotactic polypropylene, and (b) the inside layer and the inner layer between the inside layer and the outside layer comprise a resin composition which comprises 100-50 parts by weight of a syndiotactic polypropylene homopolymer or random copolymer with an Mw/Mn of 3.0 or more and 0–50 parts by weight of an ethylene-α-olefin copolymer elastomer.

29. The molded article according to claim 28, which consists of three layers.

30. The molded article according to claim 28, wherein the inside and the inner layer comprise a resin composition which comprises 100-50 parts by weight of a syndiotactic polypropylene with an Mw/Mn of between 3 and 20.

31. The molded article according to claim 30, wherein the inner layer comprises a resin composition which comprises 100-50 parts by weight of a syndiotactic polypropylene with an Mw/Mn of between 3.5 and 10.

32. The molded article according to claim 28, wherein the inner layer comprises a resin composition which comprises 100-50 parts by weight of a syndiotactic polypropylene with an Mw/Mn of between 3 and 20.

33. The molded article according to claim 32, wherein the inside and the inner layer comprise a resin composition which comprises 100-50 parts by weight of a syndiotactic polypropylene with an Mw/Mn of between 3.5 and 10.

34. The molded article according to claim 28, wherein the outside layer has a thickness of 50% or less of the total thickness of the molded article.

35. The molded article according to claim 34, wherein the outside layer has a thickness of 40% or less of the total thickness of the molded article.

36. The molded article according to claim 35, wherein the outside layer has a thickness of 30% or less of the total thickness of the molded article.

37. The molded article according to claim 28, wherein the outside layer has a thickness of 400 μm or less.

* * * * *

UNITED STATES PATENT AND TRADEMARK OFFICE
CERTIFICATE OF CORRECTION

PATENT NO. : 5,888,636

DATED: : March 30, 1999

INVENTOR(S) : Tadashi ASANUMA et al

It is certified that error appears in the above-identified patent and that said Letters Patent is hereby corrected as shown below:

As set forth in the Official Action dated November 29, 1996, please include the following prior art:

<u>U.S. Patent Documents</u>

| | | |
|---|---|---|
| 5,401,817 | 3/95 | Palackal et al |
| 5,455,305 | 10/95 | Galambos |
| 5,459,218 | 10/95 | Palackal et al |
| 5,539,056 | 7/96 | Yang et al |

Please amend the inventors last name listed for U.S. Patent No. 5,637,367 on the face of the patent from "Asnuma" to --Asanuma--. This error was made on the part of the Patent Office.

In claims 7-10, line 3, delete "weight of the" and on line 5, before "copolymer" insert --weight of the--.

Signed and Sealed this

Twenty-first Day of November, 2000

*Attest:*

Q. TODD DICKINSON

*Attesting Officer*      *Director of Patents and Trademarks*